US006460296B1

(12) United States Patent
Arquevaux

(10) Patent No.: US 6,460,296 B1
(45) Date of Patent: Oct. 8, 2002

(54) MOTOR VEHICLE DOOR WINDOW LIFTER DEVICE

(75) Inventor: Laurent Arquevaux, Sully sur Loire (FR)

(73) Assignee: Meritor Light Vehicle Systems - France, Sully sur Loire (FR)

( * ) Notice: Subject to any disclaimer, the term of this patent is extended or adjusted under 35 U.S.C. 154(b) by 0 days.

(21) Appl. No.: 09/743,344

(22) PCT Filed: Jul. 7, 1999

(86) PCT No.: PCT/FR99/01645

§ 371 (c)(1), (2), (4) Date: Jan. 8, 2001

(87) PCT Pub. No.: WO00/03111

PCT Pub. Date: Jan. 20, 2000

(30) Foreign Application Priority Data

Jul. 8, 1998 (FR) ............................................ 98 08764

(51) Int. Cl.[7] .................................................. B60J 1/16

(52) U.S. Cl. ......................................... 49/375; 411/119

(58) Field of Search .......................... 49/374, 375, 348, 49/349, 350, 351; 411/119, 116, 175

(56) References Cited

U.S. PATENT DOCUMENTS

| | | | | | |
|---|---|---|---|---|---|
| 2,181,301 | A | * | 11/1939 | Geddes | 411/119 |
| 4,464,091 | A | * | 8/1984 | Molina | 411/119 |
| 5,363,595 | A | | 11/1994 | Wirsing | |
| 5,502,926 | A | * | 4/1996 | Grace et al. | 49/375 |
| 5,537,783 | A | * | 7/1996 | Kazino et al. | 49/375 |
| 5,546,704 | A | * | 8/1996 | Maruoka | 49/375 |
| 5,599,148 | A | * | 2/1997 | Hirose | 411/175 |
| 5,622,005 | A | * | 4/1997 | Ochenski et al. | 49/375 |
| 5,778,599 | A | * | 7/1998 | Saito | 49/375 |
| 5,966,872 | A | * | 10/1999 | Wasek et al. | 49/375 |

FOREIGN PATENT DOCUMENTS

| | | |
|---|---|---|
| DE | 4416348 | 1/1995 |
| DE | 4321616 | 5/1995 |

* cited by examiner

*Primary Examiner*—Jerry Redman

(57) ABSTRACT

The invention concerns a device comprising a rail guiding a window support slider and fixing said slider on said window. A pin is pre-mounted in an opening of a branch of the slider, opposite a corresponding passage hole in the window, and a screw pre-assembled to the second branch of the slider on the side opposite the pin and opposite the window hole. When the screw is screwed into the slider and through the window hole, then in an axial channel of the pin, it exerts thereon a traction which causes it to slide inside the slider hole and the window hole until is urged to stop against the slider branch. This assembly is extremely simple and ensures more dependable mounting than known devices. The user operating it senses when the assembling is completed by the increased in the screw torque. Moreover, if the pin if forgotten, the screw slips thereby warning the operable about the absence of the pin.

9 Claims, 2 Drawing Sheets

MOTOR VEHICLE DOOR WINDOW LIFTER DEVICE

BACKGROUND OF THE INVENTION

The subject of the present invention is a window lifter device for a motor vehicle door.

More specifically, the window lifter device of the present invention is of the type comprising a rail guiding a runner which provides support for the window and runner fixing means for fixing the window.

In the known state of the art, the connection between the window and the runner can be achieved in various ways:

In another type of connection, a peg of the runner enters a hole in the window and is locked by an attached part (fork) and fitted manually. This operation is not very easy to perform because it has to be done "blind" and its quality is often mediocre.

In another type of connection, a peg, previously push-fitted into a hole in the window, is "clipped" to an elastic part forming part of the runner, which immobilizes it and holds it in its position.

Finally, a clip can be utilized to clamp and hold the window by screwing one of the two parts of the clip.

SUMMARY OF THE INVENTION

According to one embodiment of the invention, the runner has a U-profile in which a window can be placed. A screw is partially pushed into one branch of the runner located on the opposite side of a hole in the window, and into a peg. The peg is fitted with rotation-proofing means so that it can move only in terms of translation into the runner and into the hole in the window.

According to the invention, the device has the features of the characterizing part of claim 1.

According to one embodiment of the invention, in which the runner has a U-profile in which the window can be placed, said element is a screw partially pushed into one branch of the runner on the opposite side of the hole of the window to the peg, and the latter is fitted with rotation-proofing means so that it can move only in terms of translation in the runner and in the hole in the window.

The screw is fitted prior to assembly of the window during this assembly the screw is pushed through the hole in the window and screws into the peg. When the head of the screw comes into contact with and is stopped by the runner, the tensile force exerted by the screw pulls the peg toward it. The peg slides in the passage opening in the runner and enters the hole in the window until it is stopped in abutment by the runner.

This arrangement is very simple to operate and reliably holds the fixing peg or pin correctly in position and therefore ensures the quality fit, simply by screwing a screw. Specifically, should the operator have forgotten to fit the peg, the screw will be unable to bite and will continue to turn. The operator is thus alerted to the fact that the peg is missing or that the window is not in the correct position with respect to the runner.

Other particular features and advantages of the present invention will become apparent in the course of the description which will follow, given with reference to the appended drawings which illustrate three embodiments thereof by way of nonlimiting examples.

DETAILED DESCRIPTION OF THE PREFERRED EMBODIMENT

Figure 1:
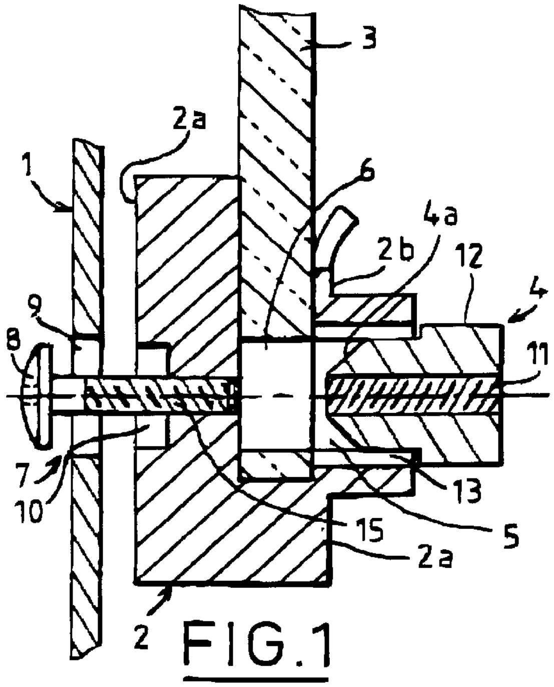
FIG. 1 is a view in partial vertical section on an enlarged scale of a window lifter device for a motor vehicle door showing one embodiment of the system for fixing the runner to the window in accordance with the invention, prior to assembly.

The window lifter device for a motor vehicle door illustrated in FIG. 1, comprises a rail 1 which guides a runner 2 which support window 3 and means for fixing the runner 2 to the window 3.

The means comprise a peg 4 premounted in an opening in the runner 2. The runner 2 consists of a U-profile with two branches 2*a*, 2*b* connected by a connection 2*c*. The window 3 is housed between the branches 2*a*, 2*b* so that the bottom of the window rests on the connection 2*c*. The separation of the branches 2*a* and 2*b* is approximately equal to the thickness of the window 3. A hole 6 is formed in the window 3, the diameter of which more of less corresponds to that of the peg 4. A hole 5 is formed in the branch 2*b* of the runner 2 located on the side of the window 3 toward the outside of the vehicle.

A screw 7 is pushed through the branch 2*a* of the runner 2 so that in the premounted state as illustrated in FIG. 1, its head 8 is inside a passage slot 9 formed in the guide rail 1 or slightly outside this slot.

Figure 2:
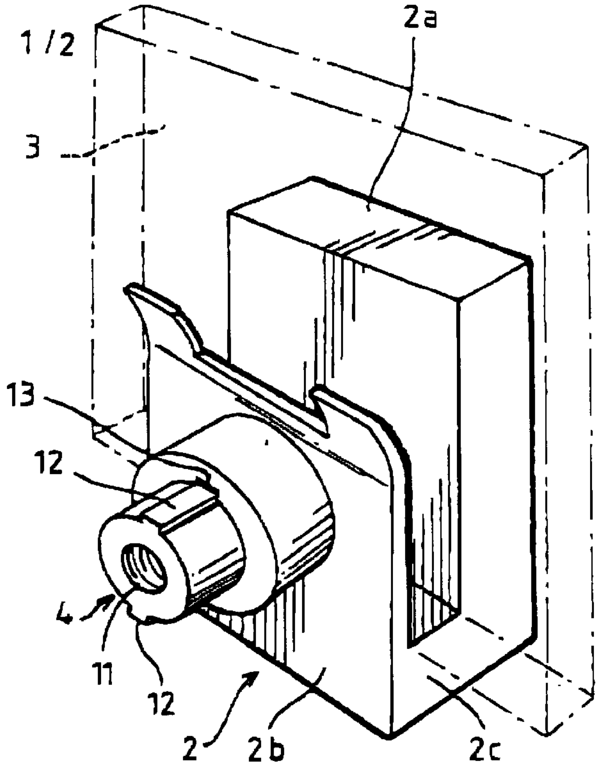
FIG. 2 is a perspective view on an enlarged scale of the runner of FIG. 1.

The screw 8 is therefore partially pushed into the runner 2, facing an axial bore 11 formed in the peg 4. The peg 4 preferably has a conical nose 4*a* and is initially partially introduced into the branch 2*b* of the runner. The peg 4 is also equipped with rotation proofing means comprising, as illustrated in FIG. 2, two diametrically opposed longitudinal peripheral ribs 12 engaged in mating splines 13 formed on the periphery of the peg 4 in the edge of the hole 5.

The runner 2 is assembled to the window 3 as follows.

In the initial state, the peg 4 is partially engaged in the hole 5, and the screw 7 is partially screwed into the branch 2*a* of the runner 2. The head 8 of the screw 7 remains in the slot 9 of the rail 1 (FIG. 1) outside a housing 10 in the branch 2*a*.

Figure 3:
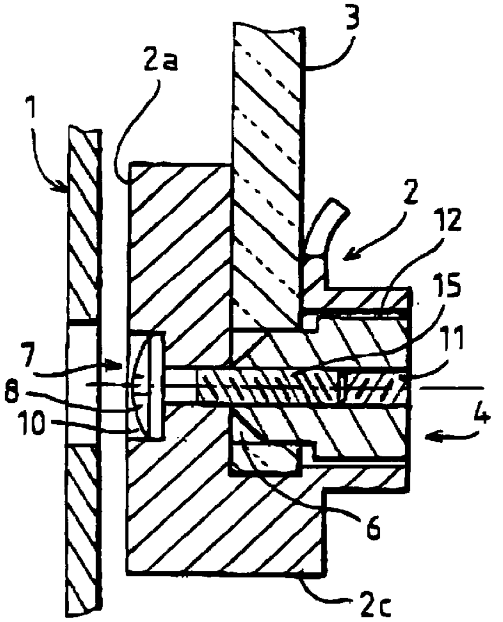
FIG. 3 is a view similar to FIG. 1, showing the device after assembly.
Figure 4:
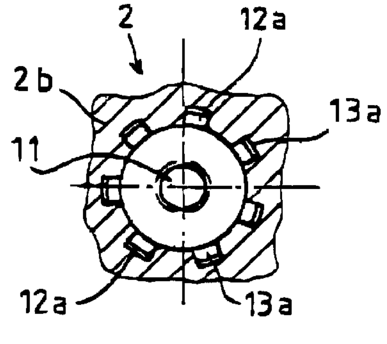
FIG. 4 is a view in cross section of the peg of the runner illustrating a second possible embodiment of the peg.

The operator turns the screw 7 which travels through the branch 2*a* until its head 8 reaches the housing 10 and abuts thereon. At that moment, the end of the threaded shank 15 is engaged in the axial passage 11, the diameter of which is slightly smaller than that of the threaded shank 15. Rotation of the threaded shank 15 pulls the peg 4 into the holes 5 and 6, which it enters through translational movement without rotating about its axis because of the rotation-proofing system 12, 13. The translational movement of the peg 4 stops when its nose 4*a* comes into abutment against the internal face of the branch 2*a* of the runner 2, as illustrated in FIG. 3. The tensile force exerted on the peg 4 by the turning of the screw 7 causes the peg to pass through the hole 6 and fixes the window 3 to the runner 2.

Figure 5:
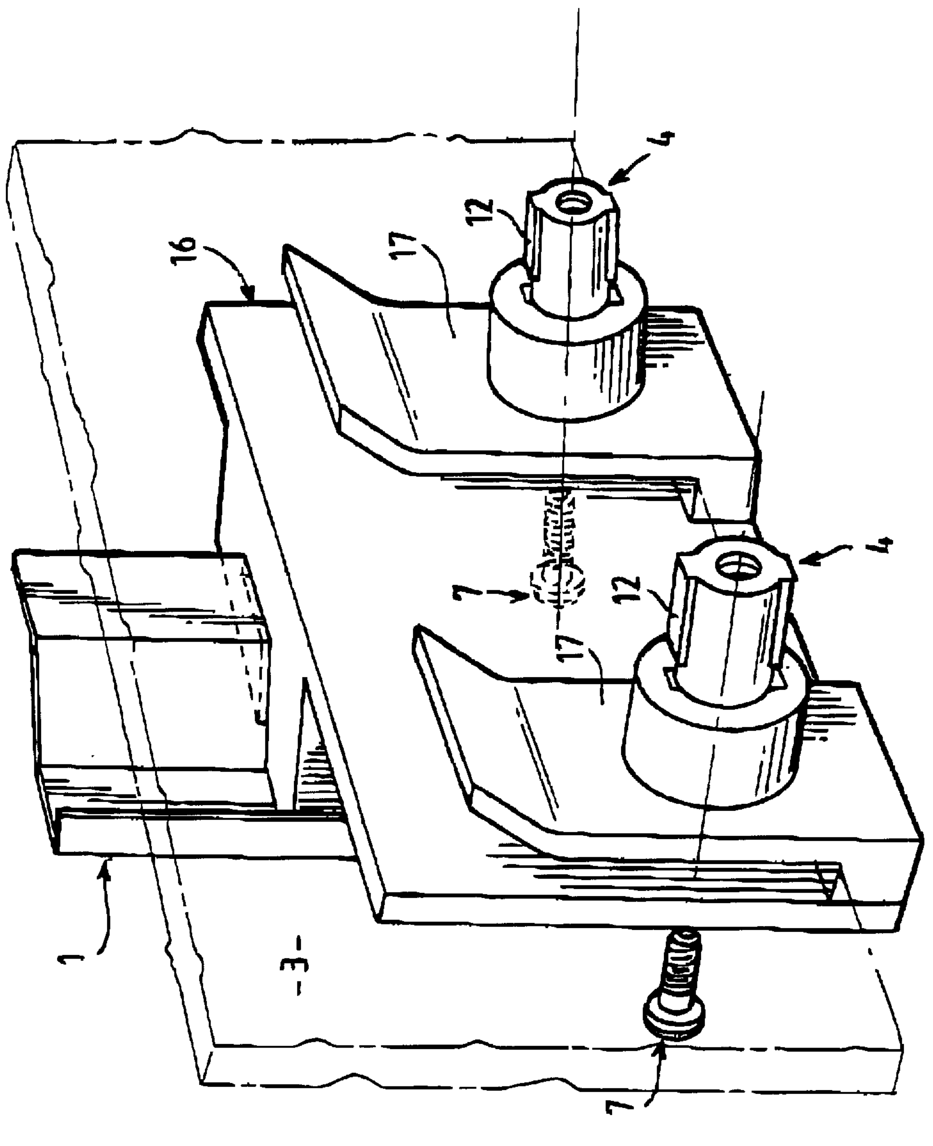
FIG. 5 is a perspective view of a third embodiment of the device according to the invention.

FIG. 5 illustrates a third embodiment of the device. The runner 16 is dimensioned widthwise in such a way that it extends laterally beyond the sides of the rail 1. It has two branches 17 delimiting respective U-profiles housing the window 3 and arranged laterally beyond the sides of the rail 1. The same is therefore, true of two pegs 4 associated with two respective screws 7, and two corresponding holes 6 in the window 3, each peg 4 being mounted on one branch 17.

The runner 16 has dimensions greater than those of the runner 2, and this arrangement provides the window 3 with stability by preventing it from rotating about an axis YY'.

Aside from the aforementioned advantages, the invention also has the following ones.

The peg 4 can be incorporated into the molding of the runner 2.

The solution according to the invention is less expensive that a solution with clips.

Mounting is more reliable than the earlier known mountings because it makes it easier to detect a defect during assembly even if the operator cannot visually see the actual assembly. Specifically, if the hole 6 in the window 3 is not correctly positioned opposite the screw 7, the screw will rotate freely and the defect will immediately be detected. Furthermore, the operator detects the end of screwing by a very sharp increase in the torque applied on the screw 7 when the inner face of the branch 2*a* of the runner 2 is in contact with the nose 4*a* of the peg 4. The operator is thus alerted to the fact that the assembly operation is finished.

The passing of the head 8 of the screw 7 through the slot 9 in the bottom of the rail 1 or in any support lug there may be also increases the reliability of the mounting. Specifically, if the operator forgets to tighten the screw 7, the runner 2 and the window 3 remain immobilized with respect to the guide rail 1 and the window lifter cannot be operated. The operator is therefore necessarily informed of his oversight.

The forces exerted pass through a steel component (screw 7), which is more advantageous than the use of plastic parts because the mechanical properties of metal parts are better known.

The invention can be varied in various ways. Thus, the screw 7 may be replaced by any other equivalent element insofar as it can be pushed through the branch 2*a* of the runner 2 and into the peg 4 so as to pull the latter toward it to make it slide in the holes 5 and 6 until it jams against the runner 2.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A window lifter device for a motor vehicle door comprising:

a runner to support a window having a first side with an opening and an opposing second side;

a rail to guide said runner including a slot;

peg for fixing said runner to said window, said peg being premounted in said opening on said first side of said runner and positioned opposite a passage hole in said window; and an element pre-assembled on said second side of said runner and facing said passage hole of said window, said element being pushed through said slot in said rail, said runner, and through said passage hole into said peg, pulling said peg into said passage hole and fixing said runner to said window.

2. The device as recited in claim 1 wherein said runner has a U-profile in which said window can be arranged, said element is a screw partially pushed into said second side of said runner, and said peg is rotation-proofed to allow only translation of said peg into said runner and into said passage hole in said window.

3. A window lifter device for a motor vehicle door comprising:

a runner to support a window having a first side with an opening and an opposing second side;

a peg capable of translational movement in said opening of said runner for fixing said runner to said window, said peg being premounted in said opening on said first side of said runner and positioned opposite a passage hole in said window; and an element pre-assembled on said second side of said runner and facing said passage hole of said window, said element being pushed through said runner and through said passage hole into said peg, pulling said peg into said passage hole and fixing said runner to said window.

4. A window lifter device system for a motor vehicle door comprising:

a window including a passage hole;

a runner to support said window having a first side with an opening and an opposing second side;

a rail to guide said runner including a slot;

a peg for fixing said runner to said window, said peg being premounted in said opening on said first side of said runner and positioned opposite a passage hole in said window; and an element pre-assembled on said second side of said runner and facing said passage hole of said window, said element being pushed through said slot in said rail, said runner, and through said passage hole into said peg, pulling said peg into said passage hole and fixing said runner to said window.

5. A window lifter device for a motor vehicle door comprising:

a runner having a U-profile to support a window having a first side with an opening and an opposing second side;

a rail to guide said runner;

a peg for fixing said runner to said window, said peg being premounted in said opening on said first side of said runner and positioned opposite a passage hole in said window and rotation-proofed to allow only translation of said peg into said runner and into said passage hole in said window by including at least one peripheral longitudinal rib in said peg and at least one mating spline formed in said opening in said runner; and a screw pre-assembled on said second side of said runner and partially pushed into said second side of said runner and facing said passage hole of said window, said screw being pushed through said runner and through said passage hole into said peg, pulling said peg into said passage hole and fixing said runner to said window.

6. The device as recited in claim 5 wherein there are seven peripheral longitudinal ribs in said peg and seven mating splines formed in said opening in said runner.

7. A window lifter device for a motor vehicle door comprising:

a runner having a U-profile to support a window having a first side with an opening and an opposing second side;

a rail to guide said runner having a slot formed in said rail for the introduction of a screw into said runner, a head of said screw being located in said slot prior to assembly of said runner to said window;

a peg for fixing said runner to said window, said peg being premounted in said opening on said first side of said runner and positioned opposite a passage hole in said window and rotation-proofed to allow only translation of said peg into said runner and into said passage hole in said window; and said screw pre-assembled on said second side of said runner and partially pushed into said second side of said runner and facing said passage hole of said window, said screw being pushed through said runner and through said passage hole into said peg, pulling said peg into said passage hole and fixing said runner to said window.

8. The device as recited in claim 7 wherein an axial bore is formed in said peg to accommodate said screw.

9. A window lifter device for a motor vehicle door comprising:

a runner including a pair of branches each having a U-profile to support a window, each branch having a first side with an opening and an opposing second side, and said runner is dimensioned widthwise to extend laterally beyond a pair of sides of a rail;

said rail to guide said runner;

a pair of pegs each mounted on said respective branch for fixing said runner to said window, each of said pegs being premounted in said opening on said first side of said runner and positioned opposite a passage hole in said window and rotation-proofed to allow only translation of said peg into said runner and into said passage hole in said window; and a pair of screws each associated with one of said pegs and pre-assembled on said second side of said runner and partially pushed into said second side of said runner and facing said passage hole of said window, each of said screws being pushed through said runner and through said passage hole into said respective peg, pulling said peg into said passage hole and fixing said runner to said window, said pegs and said associated screws being located laterally beyond said pair of sides of said rail.

* * * * *